Patented June 18, 1940

2,205,084

UNITED STATES PATENT OFFICE 2,205,084

AGE RESISTOR

Albert M. Clifford, Stow, Ohio, assignor to Wingfoot Corporation, Wilmington, Del., a corporation of Delaware No Drawing. Application June 16, 1936,
Serial No. 85,555

7 Claims. (Cl. 260—810)

This invention relates to new compositions of matter and to compounds for use as age resistors in rubber and similar materials. More particularly, the invention relates to quinone-naphthol addition compounds.

Various chemical substances have been applied to rubber for the purpose of retarding deterioration of such rubber due to the effects of heat, light, air, flexing and other ageing influences. The present invention concerns certain compounds for this purpose formed by interaction of a quinone and a naphthol, some of the compounds being new compositions not heretofore known and others being known in the art, but not for the purpose of treating rubber.

The compositions are prepared by bringing the quinone and the naphthol together in solution under comparatively mild conditions of reaction. In general, it suffices to maintain the reaction mixture at room temperature, or the solution may be permitted to warm up due to heat of reaction, or it may even be necessary to cool the mixture during reaction. Any method of preparation may be used which results in the desired addition compounds. However, it is found that certain methods pursued may be modified to yield two classes of compounds within the scope of the invention, one of these being colored and prepared under substantially neutral conditions, as by warming in a neutral solvent, while the other is colorless or white and is prepared under acid conditions, as by employing a solvent containing several drops of a concentrated mineral acid per 100 cc. of solvent.

Thus, a deeply colored compound may be prepared by reacting beta naphthol and benzo quinone under neutral conditions, whereas these same substances, when reacted in an acidic medium, produce a white crystalline body. These latter colorless or white substances have not heretofore been described so far as known.

Among the naphthols which may be employed to yield the compounds of the invention may be mentioned alpha naphthol, beta naphthol, and naphthols carrying another hydroxyl group or a hydrocarbon substituent such as methyl or isopropyl, or another neutral substituent. Among the quinones are included benzoquinone, toluquinone, xylol quinone, phenyl benzoquinone, alpha naphthoquinone, beta naphtho quinone and phenanthraquinone. Other compounds of these same classes may also be utilized.

The addition compound usually consists of one mol of each of the ingredients but it may consist of two mols of the naphthol combined with one mol of the quinone. Generally speaking, the mol for mol addition compounds are the most desirable for use in rubber. The quinone and naphthol may be reacted in these proportions or an excess of the naphthol may be present.

As illustrative of the manner in which the compounds may be prepared, the following examples are given.

Example 1

A benzene solution of 29 grams of beta naphthol in 250 cc. of benzol, the benzol being warmed to effect solution, was treated with a solution of 11 grams of benzoquinone in about 75 cc. of benzol. The mixture darkened somewhat and, after standing overnight, during which time some solvent evaporated, a quantity of reddish-brown crystals had deposited. This product, obtained in a yield of 21 grams, melted in the neighborhood of 99°–103° C. and was tested in rubber. It will be noted that the reaction conditions were substantially neutral.

Example 2

In this case, 58 grams of beta naphthol and 21.5 grams of benzo quinone were dissolved in glacial acetic acid and 3 drops of concentrated sulphuric acid were added. Heat was evolved by the reaction and a light gray solid formed on standing overnight. The product was recovered by filtration and was washed with gasoline to yield 68.9 grams of the compound. On recrystallization from alcohol, the substance was obtained as white crystals having a melting point of 163°–165° C. It is probable that the reaction in this example proceeded in accordance with the following equation, acid conditions prevailing as will be noted:

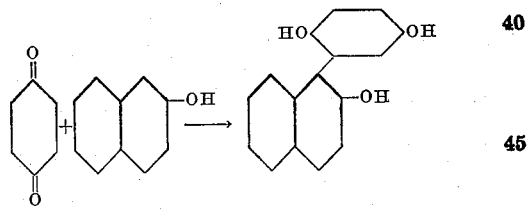

Example 3

The reaction was again effected under acid conditions by mixing a solution of 10.8 grams of benzoquinone and 14.4 grams of beta naphthol in 100 cc. of cold benzol and adding one gram of a solution of 10% $H_2SO_4$ in acetic acid. An immediate vigorous exothermic reaction occurred, necessitating cooling. The product, separating first as a liquid, became crystalline on stirring. After digestion for 2 hours on a steam bath, the mixture was cooled and filtered and then washed with cold benzol. There was obtained a yield of 22 grams of a substance having a melting point of 165° C. Further purification was effected by five successive recrystallizations from a mixture of equal parts of acetone and benzol, the product obtained being pure white crystals having a constant and definite melting point of 181° C.

Other addition compounds which may be obtained by similar procedures to those illustrated have been identified as follows:

|  | M. P., °C. |
|---|---|
| α naphthoquinone (1 mol) +α naphthol (1 mol)—red needles | 97 |
| Phenanthraquinone (1 mol) +α naphthol (1 mol)—red plates | 139 |
| Benzoquinone (1 mol) +α naphthol (1 mol)—red plates | 100 |
| Benzoquinone (1 mol) +α naphthol (2 mols)—red plates | 120 |

[See Ber. 42 1149 (1909)]

Age resistors for rubber may also be obtained by utilizing fluorenone and reacting this with one of the naphthols mentioned, such as beta naphthol. [(Ber. 43 157 (1909).]

Certain of these compounds were tested in rubber to determine their antioxidant or age-resisting effect, the compounds being incorporated in a stock of the following composition:

|  | Parts |
|---|---|
| Extracted rubber | 100.0 |
| Zinc oxide | 5.0 |
| Sulphur | 3.0 |
| Hexamethylene tetramine | 1.0 |
| Stearic acid | 1.5 |
| Antioxidant | 1.0 |

The rubber samples, so made up and containing the age resistor, were aged in an oxygen bomb for six days at a temperature of 50° C. and under a pressure of 150 pounds per square inch. The following data was obtained:

| Cure | Original | | | | Aged | | | | Percent wt. inc. | T. R. |
|---|---|---|---|---|---|---|---|---|---|---|
|  | Tens. | Elg. | 500% | 700% | Tens. | Elg. | 500% | 700% |  |  |

EXAMPLE 1.—*Beta naphthol + benzoquinone (neutral)*

| Cure | Tens. | Elg. | 500% | 700% | Tens. | Elg. | 500% | 700% | Percent wt. inc. | T. R. |
|---|---|---|---|---|---|---|---|---|---|---|
| 35/285 | 78 | 900 | 11 | 28 | 108 | 830 | 17 | 55 | .08 | 124 |
| 50 | 96 | 835 | 15 | 44 | 118 | 780 | 21 | 77 | .26 |  |
| 70 | 116 | 790 | 20 | 69 | 135 | 745 | 28 | 106 | .29 |  |

EXAMPLE 2.—*Beta naphthol + benzoquinone (acid)*

| Cure | Tens. | Elg. | 500% | 700% | Tens. | Elg. | 500% | 700% | Percent wt. inc. | T. R. |
|---|---|---|---|---|---|---|---|---|---|---|
| 35/285 | 94 | 840 | 15 | 44 | 118 | 745 | 26 | 92 | .15 | 109 |
| 50 | 114 | 785 | 21 | 70 | 118 | 705 | 32 | 116 | .24 |  |
| 70 | 144 | 770 | 27 | 96 | 150 | 715 | 38 | 137 | .31 |  |

It will be observed that the tensile ratio (T. R.) was very satisfactory in each instance, this tensile ratio referring to the proportion or percentage of the original tensile strength which the sample retains after the period of ageing has elapsed. The results are possibly somewhat high in these particular tests due, apparently, to some aftercure during the ageing test, but the figures indicate that the compounds have excellent age-resisting properties and are so interpreted in the art.

The compound indicated as having been formed under acid conditions is colorless or white and, in view of its antioxidant power, may be suitable for use in white or light-colored rubber goods where it is desired to have a non-staining antioxidant or age resistor. Both types of compounds, however, have utility as age resistors since the color is not important in dark-colored rubber stocks. The colorless or white addition compound resulting from the interaction of the quinone and the naphthol under acid conditions is believed to be a new composition of matter not previously described. The colored compounds have been described in the literature.

The age resistors can be used in rubber itself or in those substances usually classed with rubber, such as balata, latex, reclaimed rubber, synthetic rubber, etc. and the term "rubber" as used in the claims, is intended to include such rubber-like substances. The method of application may be any found to be effective, as by incorporation in the rubber before vulcanization, application to the surface of the rubber article, admixture with latex compositions, and other methods. The invention embraces the use of the age resistors in rubber, whether or not vulcanization agents, accelerators, pigments, or other adjuvants are also present.

While there have been set forth above certain preferred embodiments of the invention, it will be apparent that the same includes a large number of compositions and is not limited to the examples herein specifically set forth. It will, accordingly, be understood that the invention is not limited to the species particularly described but only by the accompanying claims, wherein it is intended to cover, by suitable expression, all features of patentable novelty residing in such invention.

What I claim is:

1. A method of preserving rubber which comprises treating the same with an addition compound consisting of one mol of a quinone and a whole number of mols of a naphthol from 1 to 2 reacted under neutral conditions.

2. A method of preserving rubber which comprises treating the same with an addition compound consisting of one mol of a quinone and a whole number of mols of a naphthol from 1 to 2 reacted under non-alkaline conditions.

3. A method of preserving rubber which comprises treating the same with the addition compound of two mols of a naphthol and one mol of a quinone reacted under acid conditions.

4. A method of preserving rubber which comprises treating the same with the addition compound of two mols of a naphthol and one mol of a quinone reacted under neutral conditions.

5. A method of preserving rubber which comprises treating the same with an addition compound of one mol of a quinone and a whole number of mols of beta naphthol from 1 to 2 reacted under non-alkaline conditions.

6. A method of preserving rubber which comprises treating the same with the addition compound of one mol of benzoquinone and a whole number of mols of beta naphthol from 1 to 2 reacted under acid conditions.

7. A method of preserving rubber which comprises treating the same with the addition compound of equimolecular proportions of a naphthol and a quinone reacted under acid conditions.

ALBERT M. CLIFFORD.